United States Patent [19]

Fyler

[11] 3,947,734

[45] Mar. 30, 1976

[54] ELECTRONIC PERSONNEL SAFETY SENSOR

[75] Inventor: Norman F. Fyler, Deerfield, Ill.

[73] Assignee: The Stanley Works, New Britain, Conn.

[22] Filed: Sept. 6, 1974

[21] Appl. No.: 503,970

[52] U.S. Cl. ............ 317/146; 317/DIG. 2; 192/130; 340/258 C
[51] Int. Cl.[2] ........................................ G08B 13/26
[58] Field of Search ............... 317/DIG. 2, 146, 123; 340/258 R, 258 B, 258 C; 307/116; 192/130; 323/75 M

[56] References Cited
UNITED STATES PATENTS

| | | | |
|---|---|---|---|
| 3,015,077 | 12/1961 | Elam et al............................ | 317/146 |
| 3,324,647 | 6/1967 | Jedynak.......................... | 317/DIG. 2 |
| 3,409,842 | 11/1968 | Embling et al.................. | 317/DIG. 2 |
| 3,829,850 | 8/1974 | Guetersloh...................... | 340/258 C |

*Primary Examiner*—J. D. Miller
*Assistant Examiner*—Harry E. Moose, Jr.

[57] ABSTRACT

An electronic personnel safety sensor is provided capable of causing a machine or operation to be shut off to prevent injury to personnel or damage to equipment protected, by detecting, indicating, and acting upon a predetermined increase or decrease in effective capacitance caused by the introduction, or intrusion, or withdrawal of material to or from a field or protection zone created by a suitably designed and connected electrode structure. The sensor is operable in a fail-safe manner inasmuch as it does not contain any single component, part or electrical connection, the failure or removal of which would cause the sensor to permit the protected machine or operation to operate. The sensor embodies circuitry wherein all activated units thereof are connected in series and are furnished an enabling signal from a common source. The initial signal may be provided from a crystal controlled, amplitude regulated oscillator signal generator source and is AC coupled to a modified null electronic capacity sensing type bridge. The latter bridge has two symmetrically disposed arms, one of which contains a fixed reference capacitor and the other of which contains the combination of an antenna and an adjustable capacitance. The latter is used to bring the two arms of the bridge to the "null" set condition that corresponds with normal operation of the protected machine or implied non-penetration of the protection field. The original signal from the oscillator is modified by the bridge according to the state of balance. The portion of the signal passed on by the bridge is larger at a state of unbalance and a minimum but not zero, at optimum balance. This modulated signal is again AC coupled to the next stage, i.e., an operational amplifier via a suitable transformer but at the input of the operational amplifier the signal is processed to produce rectified AC with a polarized or DC component that in a specific manner in combination with the adjusted characteristics of the operational amplifier causes the latter and the following units including a normally open relay which has been moved to a closed contact position to deenergize, i.e., to completely and precipitously to effectively stop amplifying or passing the original signal if the unbalance of the bridge falls outside of prescribed limits.

9 Claims, 2 Drawing Figures

ELECTRONIC PERSONNEL SAFETY SENSOR

BACKGROUND OF THE INVENTION

Protective measures must be taken to ensure the safety of personnel operating, or those merely in the vicinity of, power presses and other like machines where it is impractical to impose mechanical barrier guards. The measures frequently used involve a requirement for providing means to sense the hands and other vulnerable body parts when the latter violate a minimum allowable space or safety margin with respect to the point of danger.

A familiar technique for sensing human or other electrically conductive parts is by capacitance. The principle of operation of this type of technique is based on the fact that the flesh of the operator is sufficiently electrically conducting to allow a properly connected sensitive bridge circuit to respond to increased capacitance, i.e., charge storage, afforded by the operator's close proximity to an antenna placed around the possible entry areas to the point of contact. However, previous capacitance sensing systems have either been too expensive, not sufficiently fail-safe, or too difficult to set up.

Insofar as concerns the matter of being fail-safe, many electronic devices, especially "binary" or digital, pulse and DC circuits use two information conditions, i.e., voltage states. It is convenient for one of the states to be at ground, "null", or near zero potential or energy condition and the other state to be near a set maximum potential. Unfortunately, in the currently popular binary systems component failures usually cause an indeterminate condition, i.e., a failure appears to be one normal state or another, and in some instances even though the circuit is no longer correctly functioning or able to change states a false impression is given. In AC circuits, many conditions also can appear like zero signal, often a normal state, when a component fails. It is, of course, possible to set up level detection circuits to define different signal levels and to be able to distinguish them from the OFF state. However, in a bridge-type circuit which is the best practical way to achieve the kind of sensitivity and stability required for this application, there will always be a zero level condition, which can not be distinguished from an "OFF" type failure condition. Hence, conventional null or zero level can not be used for the machine safe indication, if the sensing device is to be considered fail-safe.

Fail-safe is defined for the aforereferenced type of equipment in an American National Standards Document as "designed to revert to an OFF, or safeguarding condition, in the event of a power or component failure or other detrimental (condition)". There are three ways to design circuitry that can be said to achieve the fail-safe character. They are (1) to provide redundant circuits, (2) to provide monitoring circuits, or (3) to make the basic circuits intrinsically fail-safe. The intrinsic approach is by far the best because even though the first two provide for any single component's failure and many combinations of failure, it is theoretically possible for the redundant circuit and/or the monitoring circuit components to fail, as well as the basic circuit. To be truly fail-safe any component failure should result in a reaction from the instrument that disables the protected machine or operation.

Therefore, although it has been known heretofore to utilize capacitance sensing systems, the prior art forms thereof which have been provided heretodate have been characterized by the fact that they are either too expensive, not sufficiently fail-safe, or too difficult to set-up. A need has thus existed to provide a capacitance sensing system which is intrinsically fail-safe. Moreover, a desire has been expressed to provide such an intrinsically fail-safe safety system which minimizes the number of components needed to be embodied therein, particularly in comparison to redundancy and monitoring approaches which require extra components that increase the cost of providing and maintaining the system.

Accordingly, it is an object of the present invention to provide a novel and improved electronic personnel safety sensor capable of causing a machine or operation to be shut off to prevent injury to personnel or damage to equipment being protected.

It is also an object of the present invention to provide such an electronic personnel safety sensor which is operable to perform the desired protection function by detecting, indicating, and acting upon a predetermined increase or decrease in effective capacitance caused by the introduction, or intrusion, or withdrawal of material to or from a field or protection zone created by a suitably designed and constructed electrode structure.

It is another object of the present invention to provide such an electronic personnel safety sensor which embodies circuitry wherein all of the active units thereof are provided with an enabling signal which is derived by series passage through the system from a common source.

A further object of the present invention is to provide such an electronic personnel safety sensor which is intrinsically fail-safe for all components except the output relay for which redundancy and/or monitoring must be provided.

A still further object of the present invention is to provide such an electronic personnel safety sensor which requires for its implementation the inclusion in the circuitry of a minimum number of components.

Yet another object of the present invention is to provide such an electronic personnel safety sensor which is relatively inexpensive to manufacture, and relatively easy to set-up and deploy.

SUMMARY OF THE INVENTION

It has now been found that the foregoing and related objects can be readily attained in an electronic personnel safety sensor which is capable of causing a machine or operation to be shut off to prevent injury to personnel or damage to equipment being protected, by detecting, indicating, and acting upon a predetermined increase or decrease in effective capacitance caused by the introduction, or intrusion, or withdrawal of material to or from a field or protection zone created by a suitably designed and connected electrode structure. Basically, there are three possible states of condition which may exist in terms of the capacitance sensed by the instrument antenna. First, a normal value representing an intact antenna with proper coupling to the instrument and no intrusion in the detection zone. In this condition, the control signal furnished to the attached machine activates the latter. Second, a condition wherein the capacitance increases to a level indicating intrusion, for example, by an arm or a hand, and the associated machine is deactivated. Third, a condition wherein a capacitance of less than the normal is detected which results in machine deactivation and "latching". With regard to the latter condition, when this occurs the instrument which controls the operation of the machine being protected is required to be reset by someone having key-access to the innards thereof. The sensor consists of three basic functional parts namely, a power source, the electronic circuitry, and the interfacing means between the sensor and the controlled machine. In accord with one form of the invention, the power source consists of a transformer, bridge rectifier, filter and Zener diode regulation. This unit furnishes power derived from 120 V, AC lines to the other main units with the ground of the instrument and the feeder line being the same. The electronic circuitry which is built around a bridge consists of a signal source, a bridge transformer and a transistor amplifier which feeds an amplified signal to a meter and an amplifier-frequency doubler, the latter consisting of a transformer and a transistor, via another transformer. The latter referenced signal is applied to a complementary driver-pair of transistors. These transistors direct drive a series pair of relays and a lamp. The driven relays form with the suitable interface with the machine the third functional part of the sensor, i.e., the interfacing means. It should therefore be noted that in the sensor of the present invention every stage including the relays themselves, is excited by a signal derived from the preceding stage signal source. Consequently, if the signal nature, namely the level or frequency, changes from a predetermined level the ciruit is designed to deactivate the relays. This means that any perturbation along the way will be effective to cause deactivation. Moreover, this concept is carried out also in the form that the bias for the transistors is derived strictly from the signal, except for the source unit.

In accord with the preferred embodiment of the invention an electronic personnel safety sensor is provided which employs as a power signal, a controlled sine type signal which is produced from a crystal controlled, amplitude regulated oscillator signal generator source. The signal from the oscillator is fed to a modified null electronic capacity sensing type bridge. This signal is AC coupled through a transformer, therefore any perturbation of this signal will be transmitted. In particular, if the generator fails for any reason the system will show a non-safe condition. The bridge has two symmetrically disposed arms, one of which contains a fixed reference capacitor and the other of which contains the combination of an antenna and an adjustable capacitance. The latter is used to bring the two arms of the bridge to the null condition balance or off balance that corresponds to normal operation or implied non-penetration of the protection zone. The original signal from the oscillator is modified by the bridge according to the state of balance. The signal is larger at a state of unbalance and a minimmum, but not zero, at optimum balance. This modulated signal is again AC coupled to the next stage, i.e., an operational amplifier via a suitable transformer but at the input of the operational amplifier the signal is processed to produce a polarized DC component that in a specific manner in combination with the adjusted characteristics of the operational amplifier causes the operational amplifier and the following units including a normally open relay which has been moved to a closed contact position to energize the machine, to deenergize, i.e., to completely and precipitously to effectively stop amplifying or passing the original signal if the unbalance of the bridge falls outside of prescribed limits.

DETAILED DESCRIPTION OF THE ILLUSTRATED EMBODIMENTS

Figure 1:
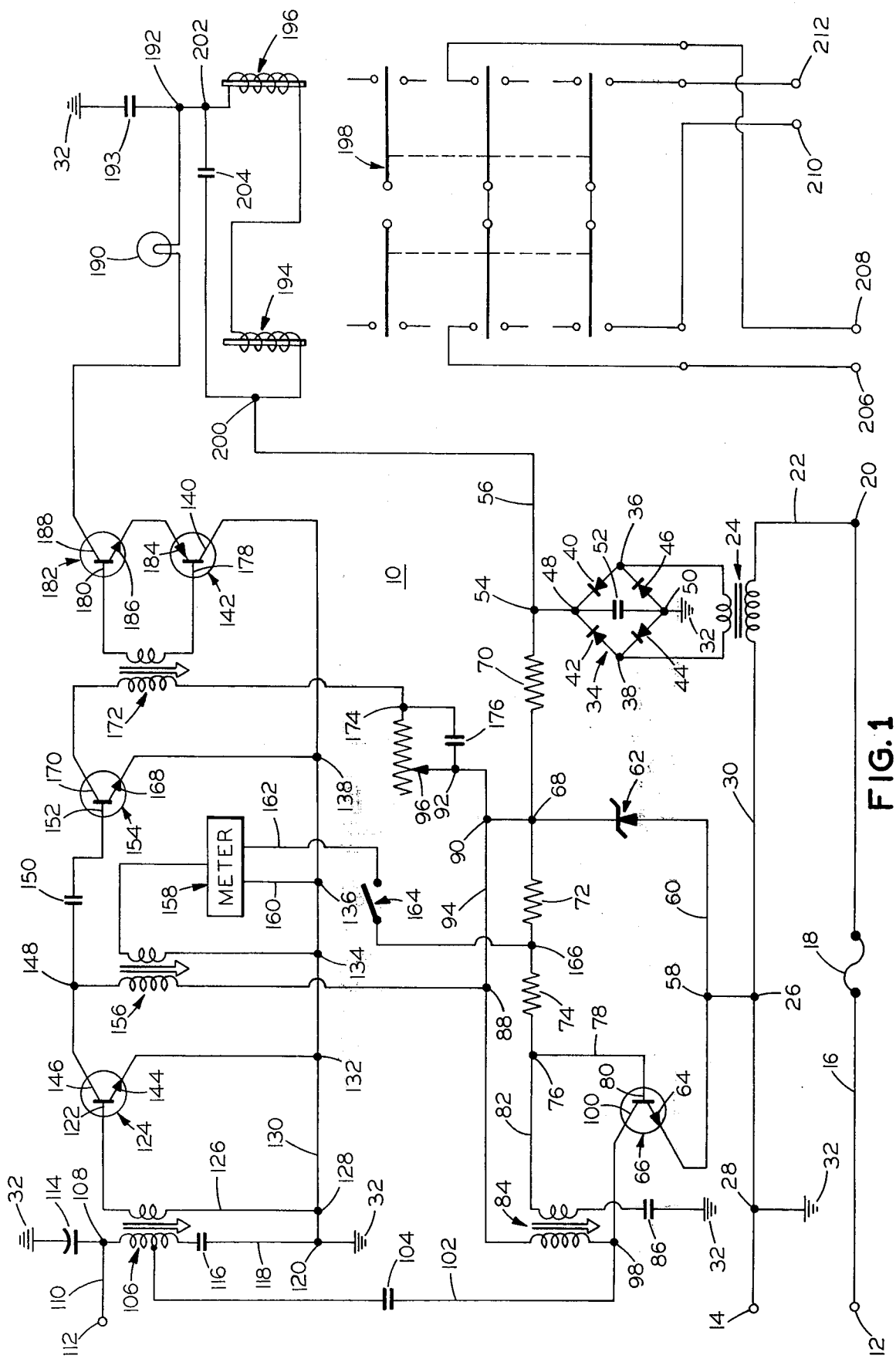
FIG. 1 is a schematic diagram of the circuitry of one embodiment of an electronic personnel safety sensor constructed in accordance with the present invention.

Referring now to the drawings, and more particularly FIG. 1 thereof, there is depicted therein the circuitry for an electronic personnel safety sensor, generally designated by reference numeral 10, constructed in accordance with the present invention. The sensor 10 is characterized by the fact that it is always in unbalanced operation. Power for the sensor 10 is derived from the 120 V, AC lines which are also utilized to supply power to the machine (not shown) with which the sensor 10 is cooperatively associated. More particularly, the circuitry of the sensor 10 is connectable in circuit relation with the aforereferenced 120 V, AC lines through the terminals 12 and 14. As shown in FIG. 1 the terminal 12 is connected through conductor 16, a fuse 18, a junction 20 and conductor 22 to one side of the primary of a transformer 24. The other side of the primary of the transformer 24 is connected in turn to the other terminal, i.e., terminal 14 through junctions 26 and 28 by means of conductor 30. It will be noted with reference to FIG. 1 that the conductor 30 is connected through junction 28 to ground 32.

The transformer 24 functions to AC couple the power being supplied through the terminals 12 and 14 to the normally OFF-NULL bridge, generally designated in FIG. 1 by reference numeral 34. To this end, the secondary of the transformer 24 is connected through the terminals 36 and 38 to the bridge 34. The latter bridge 34 includes four diodes 40, 42, 44 and 46 electrically connected in circuit relation with the diode 40 being connected between terminals 36 and 48, diode 42 between terminals 38 and 48, diode 44 between terminals 38 and 50 and diode 46 between terminals 36 and 50. As shown in FIG. 1, the bridge 34 is connected to ground 32 through terminal 50. Completing the description of the bridge 34, a capacitor 52 is connected across the terminals 48 and 50. In addition, the bridge 34 is connected through terminal 48 and junction 54 to the conductor 56.

Returning to a consideration of the conductor 30, it will be understood with reference to FIG. 1 that the conductor 30 is connected through junctions 26 and 58 to the conductor 60. The latter conductor 60 functions to connect in circuit relation a Zener diode 62 with the emitter 64 of a transistor 66. The Zener diode 62 in turn is connected through junction 68 to one side of a resistor 70 with the other side thereof being connected to the aforereferenced junction 54. In addition, the junction 68 functions to connect in circuit relation the resistor 70 with a pair of series connected resistors 72 and 74. The resistors 72 and 74 are connected through junction 76 and conductor 78 to the base 80 of the transistor 66 and through junction 76 and conductor 82 to one side of a transformer 84, which is connected to ground 32 and which also has connected therewith a capacitor 86.

The other side of the transformer 84 is connected through junctions 88, 90 and 92 by means of conductor 94 to a potentiometer 96. In addition, the aforesaid other side of the transformer 84 is connected through junction 98 to the collector 100 of the transistor 66. Junction 98 is connected by means of conductor 102 in circuit relation with a capacitor 104 and one side of the transformer 106. The latter one side of the transformer 106 is connected through junction 108 to lead 110 and terminal 112, and to capacitor 114 and ground 32. In addition, the aforesaid one side of the transformer 106 has connected thereto another capacitor, i.e., capacitor 116 and is connected by means of conductor 118 and junction 120 to ground 32. The other end of the transformer 106 has one end thereof connected to the base 122 of the transistor 124. The other end of the latter other side of the transformer 106 is connected by means of conductor 126 to junction 128 and therethrough to conductor 130. The latter conductor 130 functions to interconnect junctions 120, 128, 132, 134, 136 and 138 to the collector 140 of the transistor 142.

Continuing with a description of the circuitry of the sensor 10 depicted in FIG. 1 of the drawings, as shown therein the emitter 144 of the transistor 124 is connected through junction 132 to conductor 130 while the collector 146 of the transistor 124 is connected through junction 148 and capacitor 150 in circuit relation with the base 152 of the transistor 154. One side of a transformer 156 has one end thereof connected to the previously described junction 88. The other side of the transformer 156 is connected between the junction 134 and one side of a meter 158. The latter meter 158 has two other leads, namely, leads 160 and 162 connected thereto. The lead 160 serves to interconnect the meter 158 with the junction 136 while the other lead 162 connects the meter 158 with a normally open switch 164 to the midpoint 166 of the series connected pair of resistors 72 and 74.

Referring now again to the transistor 154, the emitter 168 thereof is connected through junction 138 to the conductor 130. The transistor 134 has its collector 170 connected to one side of the transformer 172. One end of the latter one side of transformer 172 is connected to one terminal 174 of the potentiometer 96. A capacitor 176 is connected across the terminals, i.e., terminals 92 and 174 of the potentiometer 96. Returning to the transformer 172, the other side thereof has one end connected to the base 178 of the transistor 142 and the other end connected to the base 180 of the transistor 182. The two emitters, i.e., emitters 184 and 186 of the transistors 142 and 182, respectively, are interconnected as shown in FIG. 1. In addition, the collector 188 of the transistor 182 is connected in circuit relation with a lamp 190 and through junction 192 to a capacitor 194 and ground 32.

Completing the description of the circuitry of the sensor 10, the latter as depicted in FIG. 1 includes a pair of relays 194 and 196 which are cooperatively associated in accord with one embodiment of the invention with a three-pole, double throw switch which has been generally designated in FIG. 1 by reference numeral 198. Although a 3PDT switch 198 has been depicted as being employed in the circuitry of FIG. 1, it is to be understood that other suitable conventional forms of switching means could be substituted therefor if so desired, without departing from the essence of the invention. The relay coils 194 and 196 are interconnected with each other and between the junctions 200 and 202. The junction 200 in turn is connected to the conductor 56 while the junction 202 is connected to the junction 192. A capacitor 204 is connected between the two junctions 200 and 202. Insofar as concerns the switch 198, by connecting to the terminals 206 and 208 a NO mode of operation may be obtained, while the terminals 210 and 212 are similarly capable of being utilized for purposes of obtaining a NC mode of operation.

There will now be set forth a description of the mode of operation of the circuitry of the sensor 10. The latter consists from the standpoint of function of three basic parts. First, there is provided a power source of 24 volts and 20 volts DC regulated consisting of a transformer 24, a bridge rectifier 34, filter and Zener diode 62 regulation. This unit furnishes power to the other main units derived from 120 V, AC lines 16 and 30, which also preferably are the lines which feed the machine (not shown) being protected by the sensor 10, with the ground of the latter and the feeder line being the same. A 4 amp fuse 18 is preferably employed in the manner shown in FIG. 1. The second part of the circuitry of the sensor 10 is the electronic circuitry which is built around the sensing bridge 106 and consists of a signal source, namely, transistor 66 and associated components, the bridge transformer 106 and the transistor 124, which feeds an amplified signal to the meter 158 and the amplifier-frequency doubler transistor 154 and the transformer 172 via transformer 156. By means of transformer 172, the signal is applied to a complementary driver-pair of transistors 182 and 142. The latter pair of transistors 182 and 142 direct drive a series pair of relays 194 and 196 and a lamp 190. The latter driven relays 194 and 196 form with the suitable interface of the machine (not shown) the third function of power interface, as shown.

It should be noted here that component 156 of FIG. 1 is an inductor that in combination with component 150 forms a series resonant circuit, at oscillator frequency, and forms a coupling for transistor 154. Moreover, it should be noted that transformer 172 is tuned or resonated at twice oscillator frequency to, in combination, achieve a "saturation" or roll-off characteristic in the amplifier set. The latter arrangement is provided by deliberate purposive planning.

It is important to point out that in the sensor 10 every state, including the relays 194 and 196 themselves, is excited by a signal derived from the signal source. Consequently, if the signal nature, i.e., level or frequency, changes from a predetermined level the circuit is designed to deactivate the relays 194 and 196. This means that any perturbation along the way will deactivate. This idea is carried out also in the form that the bias for the transistors is derived strictly from signal, except the source unit. Many of the components and subsystems of the circuitry of the sensor 10 have an interlocking effect for exclusion gating. For instance, the meter 158 is used to indicate state to the user. In addition, the meter 158 measures signal level and thus indicates effective capacity, and also serves as a latch if the antenna for instance is removed. This component i.e., the meter 158 removes the bias from the transistor 66 source and shuts down the sensor 10 by dropping the signal to zero. Thus, there is double protection and latching indication in the event of antenna tempering or out of specification operation. Moreover, this deactivation is locked in until switch 164 is opened by a key-equipped person. A duality of function is also provided by the lamp 190 which serves as a state indicator, i.e., green light for the relay driver circuit.

Two relay 194 and 196 are preferably used in series so that if one has sticking points the other relay can still deactivate the external circuit. In accord with the illustrated embodiment of the sensor 10, three PDT contacts are provided in each of the relays 194 and 196 for the appropriate interlock and to give NC or NO operation, independently, for further redundant control. The relays 194 and 196 in the sensor 10 are designed to have a 4 amp, 120 V, AC rating per contact set. The power requirements for the electronics and power supply of the circuitry of the sensor 10 is less than two and one-half watts, which is the worse condition, a 4 amp fuse thereby provides protection.

A little more detail relevant to the operation of the bridge 34 will now be set forth. As shown in FIG. 1, the transformer 106 has two branches that feed to ground 32 through capacitors 114 and 116. The capacitor 114 is a vernier controlled variable condenser with a maximum capacity of 365 pf. This component, i.e., capacitor 114 is in parallel with the capacity seen at the antenna or sensor terminals. The intent is to maintain a specific state of unbalance in the bridge by compensation of the variation in the sensor antenna effective normal capacity. Namely, if a sensor electrode of low capacity is used, capacitor 114 is increased to compensate. If a large, high capacity electrode were used the proper degree of unbalance would be achieved by reducing the capacity at the capacity 114. Thus, the circuitry of the sensor 10 sees the same value of capacity with a relatively wide range of antenna.

The fail-safe features of the sensor 10 are obtained by the techniques of interlocking action, making components and subsystems intrinsically fail-safe, or by redundant function. The deactivation point is adjusted by the capacitor 114 for the high limit and potentiometer 96 for the low limit and the characteristic is shaped by adjustments of the transformers. The latter, however, is not regarded as an ordinary, day to day adjustment. Therefore, for a given application it is found that a one-knob control for the capacitor 114 will suffice.

Figure 2:
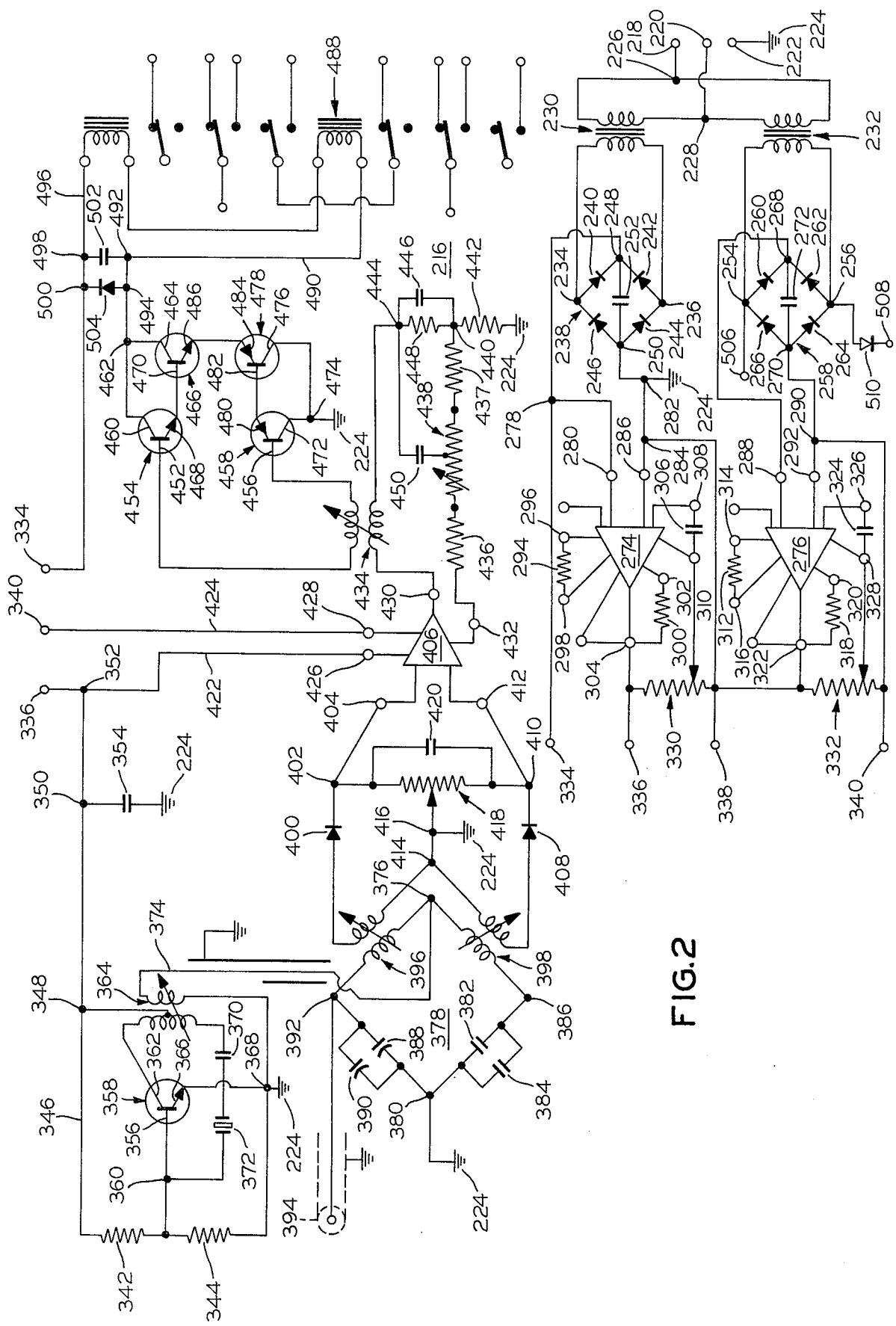
FIG. 2 is a schematic diagram of the circuitry of another emodiment of an electronic personnel safety sensor constructed in accordance with the present invention.

Referring now to FIG. 2 of the drawings, there is illustrated therein the circuitry of another embodiment of electronic personnel safety sensor, generally designated by reference numeral 216, constructed in accord with the present invention. The sensor 216 is characterized in that it is a balanced bridge at normal or unperturbed condition. This contrasts with the sensor 10 which is always in unbalanced operation. Another significant difference between the sensor 10 and the sensor 216 lies in the sensitivity thereof. More specifically, whereas the sensor 10 operates at a typical sensitivity of 3 pf, the sensor 216 is capable of operating at a sensitivity of 0.3 pf. For purposes of maintaining clarity of illustration in the drawings the circuitry of the sensor 216 has been depicted in two parts. However, it is to be understood that as will be described subsequently, the two parts are in actuality physically interconnected in circuit relation.

As illustrated in FIG. 2 of the drawings, the sensor 216 consists of five major sections, namely, a power supply, an oscillator, a bridge, an operational amplifier and a relay driver. Considering first the power supply, the circuitry of the sensor 216 is connectable by means of the three terminals 218, 220, and 222 to a 3 lead, 120 V, AC, 60 cycle line. Terminal 222 is connected to ground 224. Each of the other two terminals, i.e., terminals 218 and 220 are connected through junctions 226 and 228, respectively, to one side of each of a pair of transformers 230 and 232 which are interconnected in series relation. The other side of the transformer 230 is connected through the terminals 234 and 236 to the bridge 238. The latter bridge 238 includes four diodes 240, 242, 244 and 246 electrically connected in circuit relation with the diode 240 being connected between the terminals 234 and 248, diode 242 between terminals 248 and 236, diode 244 between terminals 236 and 250, and diode 246 between terminals 250 and 234. As shown in FIG. 2, the capacitor 252 is connected across the terminals 248 and 250 of the bridge 238. In a manner similar to that described above for the transformer 230, the other side of the transformer 232 is connected through the terminals 254 and 256 to the bridge 258. The latter bridge 258 includes four diodes 260, 262, 264 and 266 electrically connected in circuit relation with the diode 260 being connected between terminals 254 and 268, diode 262 between terminals 256 and 268, diode 264 between terminals 256 and 270, and diode 266 between terminals 270 and 254. In addition, the capacitor 272 is connected across the terminals 268 and 270 of the bridge 258.

Continuing with a description of the power supply portion of the circuitry of the sensor 216, the bridge 238 is connected in circuit relation with the integrated circuit generally designated in FIG. 2 by reference numeral 274 while the bridge 258 is connected in circuit relation with the integrated circuit generally designated in the same figure by the reference numeral 276. More specifically, terminal 248 of the bridge 238 is connected through a junction 278 to one terminal, i.e., terminal 280 of the integrated circuit 274. In addition, the terminal 250 of the bridge 238 is connected through junctions 282 and 284 to another terminal, i.e., terminal 286 of the integrated circuit 274. Likewise, the terminals 268 of the bridge 258 is connected in circuit relation with the terminal 288 of the integrated circuit 276 while the terminal 270 of the bridge 258 is connected through junction 290 to another terminal, i.e., terminal 292 of the circuit 276.

As seen in FIG. 2 of the drawings, resistor 294 is connected between two of the terminals, i.e., terminals 296 and 298 of the integrated circuit 274 while resistor 300 is connected between the terminals 302 and 304 of the integrated circuit 274. In addition, a capacitor 306 is provided connected in circuit relation between the terminals 308 and 310 of the integrated circuit 274. The integrated circuit 276 is similarly provided wtth a first resistor 312 connected between the terminals 314 and 316 thereof, a second resistor 318 connected between the terminals 320 and 322 thereof, and a capacitor 324 connected between the terminals 326 and 328 thereof. In accord with the preferred embodiment of the sensor 216, the integrated circuits 274 and 276 each consist of a Type 723IC. However, it is to be understood that other type of integrated circuits could also be utilized.

Referring again to the integrated circuit 274, terminal 310 thereof is connected to the sliding contact of a potentiometer 330. The opposite ends of the potentiometer 330 are connected respectively in circuit relation with the terminal 304 of the integrated circuit 274 and through junction 284 to the terminal 286 thereof. In like manner, the terminal 328 of the integrated circuit 276 is connected in circuit relation with the sliding contact of the potentiometer 332. One end of the potentiometer 332 is connected to the terminal 322 of the integrated circuit 276 and in series with one end of the potentiometer 330. The other end of the potentiometer 332 is connected through junction 290 to the terminal 292 of the integrated circuit 276.

The interconnection between the power supply portion of the circuitry of the sensor 216 depicted in the lower part of FIG. 2 of the drawings is effected through the terminals 334, 336, 338 and 340 which appear at the left therein. Terminal 338 is employed for purposes of connecting to ground 224, while the other three terminals, i.e., terminals 334, 336 and 340 appear in the center at the top of FIG. 2 and are employed in a manner yet to be described.

With regard next to the oscillator portion of the circuitry of the sensor 216, a pair of series connected resistors 342 and 344 have one side thereof connected by conductor 346 through junctions 348, 350 and 352 to the aforedescribed terminal 336. Also, as seen in FIG. 2 junction 350 functions to connect the conductor 346 to ground 224 through the capacitor 354. The midpoint of the series connected resistors 342 and 344 is connected to the base 356 of the transistor 358 through junction 360. The collector 362 of the transistor 358 is connected to one end of one side of a variable transformer 364 while the emitter 366 of the transistor 358 is connected through junction 368 to ground 224. The other end of the aforesaid one side of the transformer 364 is connected in circuit relation with a capacitor 370, a crystal oscillator 372 and through junction 360 to the base 356 of the transistor 358. In accord with the preferred embodiment of the sensor 216, the oscillator 372 comprises a 465 khz quartz crystal. Completing the description of the oscillator portion of the circuitry of the sensor 216, the other side of the series connected resistors 342 and 344 is connected through junction 368 to one end of the other side of the transformer 364.

Reference will now be had to the bridge portion of the circuitry of the sensor 216. The transformer 364 functions to couple the signal from the oscillator portion of the circuitry to the bridge portion thereof. To this end, the other end of the other side of the transformer 364 is connected by conductor 374 to the terminal 376 of the bridge 378. Another terminal, i.e., terminal 380 of the bridge 378 is connected to ground 224. As depicted in FIG. 2, a pair of capacitors 382 and 384 are connected in parallel between the terminals 380 and 386 of the bridge 378, while a pair of variable capacitors 388 and 390 are connected in parallel for a purpose which will be described in more detail subsequently between the terminals 380 and 392 of the bridge 378. The terminal 392 is also operable for purposes of enabling a co-axial cable to be connected thereto. Completing the description of the bridge 378, the latter has the ends of one side of a first variable transformer 396 connected to the terminals 392 and 376 and the ends of one side of a second variable transformer 398 connected to the terminals 376 and 386.

The bridge portion of the circuitry of the sensor 216 is coupled by means of the aforedescribed transformers 396 and 398 to the operational amplifier portion of the circuitry. Namely, one end of the other side of the transformer 396 is connected through diode 400 and junction 402 in circuit relation with one terminal 404 of the operational amplifier 406. Moreover, one end of the other side of the transformer 398 is similarly connected in circuit relation through diode 408 and junction 410 to another terminal, i.e., terminal 412 of the operational amplifier 406. The other end of the aforesaid other side of each of the transformers 396 and 398 are connected in series relation at a junction 414. The latter junction 414 is connected in circuit relation through the junction 416 with the sliding contact of a potentiometer 418. It will be noted with reference to FIG. 2 of the drawings that the junction 416 is connected to ground 224. Referring again to the potentiometer 418, the ends thereof are connected between the aforereferenced junctions 402 and 410. In addition, a capacitor 420 is connected across the potentiometer 418.

With further reference to FIG. 2 of the drawings, a description will now be had of the operational amplifier portion of the circuitry of the sensor 216. More particularly, as illustrated in FIG. 2 the terminals 336 and 340 to which reference was had previously are connected through junction 352 and conductor 422, and conductor 424, respectively, to the terminals 426 and 428 of the operational amplifier 406. The latter operational amplifier 406 is provided with two additional terminals, i.e., terminals 430 and 432 connected in circuit relation with other components of the circuitry of the sensor 216 in a manner yet to be described. In accord with the preferred embodiment of the sensor 216. the operational amplifier 406 consists of a Type 709C IC (integrated circuit).

Returning to a consideration of the terminals 430 and 432, the former is connected to one end of one side of a variable transformer 434. Terminal 432 on the other hand is connected to a resistor 436 and a potentiometer 438, the latter being connected in series circuit relation. The other side of the potentiometer 438 is connected to a junction 440 and thereby to ground 224 through a resistor 442. The other end of the aforesaid one side of the transformer 434 is connected to a junction 444 to which there is also connected a capacitor 446, a resistor 448, and another capacitor 450. The other side of the capacitor 446 and the resistor 448 are each connected to the aforementioned junction 440. The other capacitor, i.e., capacitor 450 is connected in circuit relation with the potentiometer 438.

Turning now to a description of the manner in which the operational amplifier of the circuitry of the sensor 216 is operatively connected to the fifth and final major portion of the circuitry, i.e., the relay driver portion, as shown in FIG. 2 the transformer 434 serves to couple the former to the latter. More specifically, the other side of the transformer 434 has one end thereof connected to the base 452 of a transistor 454 and the other end connected to the base 456 of the transistor 458. The transistor 454 has its collector 460 connected through junction 462 to the collector 464 of the transistor 466 while the emitter 468 of the transistor 454 is connected to the base 470 of the transistor 466. Similarly, the collector 472 of the transistor 458 is connected through junction 474 to the collector 476 of the transistor 478. In addition, the emitter 484 of the transistor 478 is tied to the emitter 486 of the transistor 466.

Referring again to FIG. 2 of the drawings, the relay driver portion of the circuitry of the sensor 216 has been depicted therein as being connected in circuit relation with a relay section which has been generally designated in FIG. 2 by means of the reference numeral 488. The latter referenced relay section includes a multiplicity of relays. Inasmuch as the form which the relay section 488 takes will vary from one application to another, one embodiment thereof has been depicted in FIG. 2 by way of example. However, it is to be understood that the nature of the relay section 488 could be varied without departing from the essence of the invention. As seen with reference to FIG. 2, the relay driver portion of the circuitry of the sensor 216 and the relay section 488 are connected in circuit relation in the following manner. Conductor 490 interconnects one side of the relay section 488 through junctions 492 and 494 to the junction 462. The other side of the relay section 488 is connected by means of conductor 496 through junctions 498 and 500 to the terminal 334. There is provided a capacitor 502 connected across juncions 492 and 498, and a resistor 504 connected across junctions 494 and 500. Finally, it is to be understood that the terminals 254 and 256, respectively, of the bridge 258 comprise two of the terminals, identified by the same reference numerals, i.e., 506 and 508, of the relay section 488. A diode 510 is connected between the terminal 256 and the terminal 508.

There will now be set forth a description of the characteristics of the circuitry of the sensor 216. Beginning with the power supply, the latter consists of two separate systems. One of the latter produces a regulated voltage, i.e., above chassis-ground, adjustable continuously from +7.5 volts to about +22 volts by means of a conventional Type 723C IC. The second, i.e., lower, supply is essentially a mate to the first that produces the same voltage range but is negative relative to ground. Although two transformers 230 and 232 have been employed in accord with the illustrated embodiment of the sensor 216, it is to be understood that a single transformer having suitable turns ratio and rating could be utilized if so desired without departing from the essence of the invention. For minimum drift, the resistors 294 and 312 should be approximately equal to the parallel resistance of the two branches of the potentiometers 330 and 332 at the operational point. Resistors 300 and 318 were selected so as to be 9 ohm resistors thereby to give effective current limitation at 50 ma. The voltage variation was found to measure less than 1 mv/volt line input variation and a voltage variation of −2.5 mv/50 ma load current change was found. The measured variation due to temperature was about −0.2 mv per degree C, with a mean of 24° C, to 8° C.

Attention will now be directed to the oscillator portion of the circuitry of the sensor 216. As noted previously, the oscillator is designed to operate at about 465 khz. Although the exact frequency of oscillation of the oscillator once selected is not critical, the level and frequency stability thereof is. More particularly, it is desirable to utilize a relatively high frequency since capacitive resistance varies inversely with frequency. In addition, it is desirable to employ a part of the spectrum where there is a minimum of other activity, namely noise and other interference considerations. Also, it is advantageous to select a range of frequency wherein amplifiers are easy to handle and AC coupling is easy to achieve. For the above reasons as well as others, the frequency of the oscillator was purposely chosen to be 465 khz. Howeveer, it could also have been 256 khz or 455 khz, i.e., the standard IF frequencies on AM.

The oscillator portion of the circuitry of the sensor 216 as depicted in FIG. 2 of the drawings consists of a transistor circuit employing a quartz crystal 372 for frequency stability and a regulated power supply and thermally optimized bias system to help maintain level. The output is transformer coupled by IF type transformer 364 which has a built-in 185 pf resonance capacity across the primary. A 330 pf was added to the transformer 364 for impedance matching in the secondary so as to permit the same type of IF transformers to be employed in four different places in the circuitry of the sensor 216. The secondary of the transformer 364 feeds a small length of co-axial cable to one terminal of the bridge 378.

With regard to the bridge 378, the 465 khz signal of about 5 volts level is fed to the terminal 376 of the bridge 378. This signal divides into two branches of the primaries of the IF type transformers 396 and 398 of the same type used in the oscillator portion and the coupling between the next two stages. These two branches are completed to ground 224 through two capacitive legs, symmetrically disposed. Although not specifically shown in FIG. 2 of the drawings, there is an important and consistant coupling from primary to secondary circuits in the transformers 396 and 398. This factor and other design features including a provision for adjustment produce a definite minimum but not a true null or zero value as far as the AC coupled signal to the next stage is concerned. Note is also to be taken of the presence of diodes 400 and 408, capacitor 420 and potentiometer 418 at the input of the operational amplifier portion of the circuitry of the sensor 216. The two symmetrically placed diodes 400 and 408 and the RC combination produce a controlled and purposefully DC component as well as truncated 465 khz signals in a prescribed ratio. Although a potentiometer 418 has been illustrated, it is to be understood that if so desired a fixed resistor net could be substituted therefor without departing from the essence of the invention. This signal is fed to the Type 709C IF operational amplifier 406. By varying the operation voltage and the feedback net formed of resistor 436, potentiometer 438, resistor 437, resistor 442, resistor 448, capacitor 450, capacitor 446 and transformer 434, it is possible to produce a definite "window" or null or more specifically a minimum that can be controlled in width and in specific position relative to capacity at the antenna branch and reference branch of the bridge 378. In contrast to the conventional application of an operational amplifier, in the circuitry of the sensor 316 a relatively poor frequency response, particularly since the gain at DC is higher than at oscillator frequency, is sought from the operational amplifier 406 and the unit is driven to saturation both plus and minus, a zone conventionally to be avoided. Poor frequency response is associated with low cost IC units.

The output from the operational amplifier portion of the circuitry of the sensor 216 is fed to the IF type transformer 434, i.e., the primary thereof, and is AC coupled to the next stage, namely the relay driver. Again it will be noted that each state of the circuitry is AC coupled to the next stage with a transformer. Furthermore, if there is not signal, i.e., the operational amplifier 406 is blocked, the crystal 372 is malfunctioning, a broken transformer, etc., no energy is available to the relays. More specifically, the transistors 454, 458, 466 and 478 are completely cut-off because they must derive their conducting bias from the incoming 465 khz signal or there is no current flow. The drive transistors 454, 458, 466 and 478 are arranged in a complementary array so that even in the condition that two transistors are shorted out the relays would not close without the 465 khz signal. Two relays in tandem are used to give redundant function to take care of the case of a single stuck armature of contacts. Fuses, of course, should be used for further protection. The 3 PDT configuration for the relays permits the employment of two electrically isolated control circuits and a directly related to relay position lamp indication or signal.

Although two embodiments of an electronic personnel safety sensor constructed in accordance with the present invention have been shown in the drawings and described hereinabove, it is to be understood nevertheless that other modifications in the construction thereof may be made thereto by those skilled in the art without departing from the essence of the invention. In this connection some of the modifications which can be made in the sensors 10 and 216 have been alluded to herinabove while others will become readily apparent to those skilled in the art when exposed to the present description and illustration of the construction of the sensor 10 and the sensor 216. For example, the 3 PDT switch 198 can be replaced by a 2-pole switch or some other conventional form of switching means capable of being relay controlled, if so desired, without departing from the essence of the invention. As noted above the typical sensitivity of the sensor 10 is 3.0 pf. However, through the selection of components characterized by a greater degree of stability and reliability, it has been found that an improvement can be obtained insofar as concerns the sensitivity of the sensor 10. Similarly, the sensitivity of the sensor 216 can be improved from a 0.3 pf by, for example, replacing the transformers 396 and 398 in the bridge 378 by a pair of commercially available, high quality, highly stable resistors and providing suitable coupling means from junctions 392 and 386 of the sensing bridge to junctions 404 and 412 of the operational amplifier. Moreover, insofar as concerns the sensor 216, the crystal 372 thereof may be replaced by a functionally equivalent, commercially available component, if so desired, without departing from the essence of the invention. Also, the relay section 488 of the sensor 216 can take some other form without departing from the essence of the invention. For example, although DC type relays have been shown as being employed in the circuit and shunt capacitors are used to accommodate the non-symmetrical AC input or drive, AC type relays with damping windings could be employed, thereby eliminating capacities. Finally, although the preferred embodiment of the electronic personnel safety sensor consists of the sensor 216, there exists applications, particularly where lower parts count and lower cost are factors, wherein the use of the sensor 10 will be preferred.

Thus, it can be seen that the present invention provides a novel and improved electronic personnel safety sensor capable of causing a machine or operation to be shut off to prevent injury to personnel or damage to equipment being protected. Moreover, in accord with the present invention such an electronic personnel safety sensor has been provided which is operable to perform the desired protective function by detecting, indicating, and acting upon a predetermined increase or decrease in effective capacitance caused by the introduction, or intrusion, or withdrawal of material to or from a field or protection zone created by a suitably designed and constructed electrode structure. The electronic personnel safety sensor of the present invention embodies circuitry wherein all of the active units thereof are provided with an enabling signal which is derived in series from a common source. Furthermore, such an electronic personnel safety sensor has been provided in accord with the present invention which is intrinsically fail-safe for all components except the output relay for which redundancy and/or monitoring must be provided. Also, in accordance with the present invention such as electronic personnel safety sensor has been provided which requires for its implementation the inclusion in the circuitry of a minimum number of components. Finally, the electronic personnel safety sensor of the present invention is relatively inexpensive to manufacture, and relatively easy to set-up and deploy.

Having thus described the invention, I claim:

1. An electronic personnel safety sensor operable to cause a machine or operation to be shut off to prevent injury to personnel or damage to equipment being protected comprising:
   a. a power source including terminal means connectible to a power supply to provide to the sensor, said power source further including a bridge rectifier and a transformer connected in series circuit relation with said terminal means and AC coupled to said bridge rectifier;
   b. electronic circuit means including a signal source and a multiplicity of AC coupled selectively saturable subsequent stages connected in series circuit relation with said signal source, said signal source providing a signal therefrom operable to effect excitation of said multiplicity of AC coupled selectively saturable subsequent stages, said electronic circuit means also including transformers interposed between successive ones of said multiplicity of AC coupled selectively saturable subsequent stages operable to provide the AC coupling therebetween, said transformers being purposefully tuned to provide said transformers with a preselected resonance, said electronic circuit means additionally including a capacitance sensing bridge coupled to said signal source having a predetermined state of balance condition corresponding to the normal operating state of the equipment being protected and operable to modify said signal from said signal source according to the deviation from said predetermined state of balance condition of said capacitance sensing bridge, said capacitance sensing bridge having four legs, two of said four legs of said capacitance sensing bridge comprising inductors operable to inductively couple said capacitance sensing bridge to one of said multiplicity of AC coupled selectively saturable subsequent stages, said one of said multiplicity of AC coupled selectively saturable subsequent stages comprising amplifying means operable for amplifying said modulated signal received thereby from said capacitance sensing bridge, said amplifying means being coupled to another one of said multiplicity of AC coupled selectively saturable subsequent stages, said another one of said multiplicity of AC coupled selectively saturable subsequent stages comprising a relay driver; and
   c. relay means connected in circuit relation with said relay driver and excitable by said modulated signal received thereby from said relay driver, said relay means being deactivated when said modulated signal departs from a preestablished level corresponding to said predetermined state of balance condition of said capacitance sensing bridge, said relay means comprising a pair of redundant relays and associated contacts.

2. The electronic personnel safety sensor as set forth in claim 1 wherein said signal source of said electronic circuit means comprises a transistor.

3. The electronic personnel safety sensor as set forth in claim 1 wherein one of the other two legs of said four legs of said capacitance sensing bridge includes a fixed reference capacitor and the other one of the other two legs of said four legs of said capacitance sensing bridge includes an antenna and an adjustable capacitance connected in electrical series circuit relation with said antenna.

4. The electronic personnel safety sensor as set forth in claim 1 wherein said amplifying means of said electronic circuit means consists of a transistor amplifier.

5. An electronic personnel safety sensor operable to cause a machine or operation to be shut off to prevent injury to personnel or damage to equipment being protected comprising:
   a. a power source including terminal means connectible to a power supply to provide power to the sensor, said power source further including a pair of integrated circuits, a pair of bridge rectifiers each connected in circuit relation with a corresponding one of said pair of integrated circuits, and a pair of transformers connected in circuit relation with said terminal means and each AC coupled to a corresponding one of said pair of bridge rectifiers;
   b. electronic circuit means including a signal source and a multiplicity of AC coupled selectively saturable subsequent stages connected in series circuit relation with said signal source, said signal source providing a signal therefrom operable to effect excitation of said multiplicity of AC coupled selectively saturable subsequent stages, said electronic circuit means also including transformers interposed between successive ones of said multiplicity of AC coupled selectively saturable subsequent stages operable to provide the AC coupling therebetween, said transformers being purposefully tuned to provide said transformers with a preselected resonance, said electronic circuit means additionally including a capacitance sensing bridge coupled to said signal source having a predetermined state of balance condition corresponding to the normal operating state of the equipment being protected and operable to modify said signal from said signal source according to the deviation from said predetermined state of balance condition of said capacitance sensing bridge, said capacitance sensing bridge having four legs, two of said four legs of said capacitance sensing bridge comprising inductors operable to inductively couple said capacitance sensing bridge to one of said multiplicity of AC coupled selectively saturable subsequent stages comprising amplifying means operable for amplifying said modulated signal received thereby from said capacitance sensing bridge, said amplifying means being coupled to another one of said multiplicity of AC coupled selectively saturable subsequent stages, said another one of said multiplicity of AC coupled selectively saturable subsequent stages comprising a relay driver; and
   c. relay means connected in circuit relation with said relay driver and excitable by said modulated signal received thereby from said relay driver, said relay means being deactivated when said modulated signal departs from a preestablished level corresponding to said predetermined state of balance condition of said capacitance sensing bridge, said relay means comprising a pair of redundant relays and associated contacts.

6. The electronic personnel safety sensor as set forth in claim 5 wherein one of the other two legs of said four legs of said capacitance sensing bridge includes a fixed reference capacitor and the other one of the other two legs of said four legs of said capacitance sensing bridge includes an antenna and an adjustable capacitance connected in electrical series circuit relation with said antenna.

7. The electronic personnel safety sensor as set forth in claim 5 wherein said signal source comprises a 465 khz crystal control, amplitude regulated oscillator.

8. The electronic personnel safety sensor as set forth in claim 5 wherein said amplifying means of said electronic circuit means comprises an integrated circuit operational amplifier operated in a region of near saturation.

9. The electronic personnel safety sensor as set forth in claim 5 wherein said relay driver consists of four transistors connected in circuit relation so as to be arranged in a complementary array.

* * * * *